Sept. 8, 1936. F. H. BATEMAN ET AL 2,053,390
ASSISTED FEED PLANTER
Filed Dec. 21, 1933 3 Sheets-Sheet 3
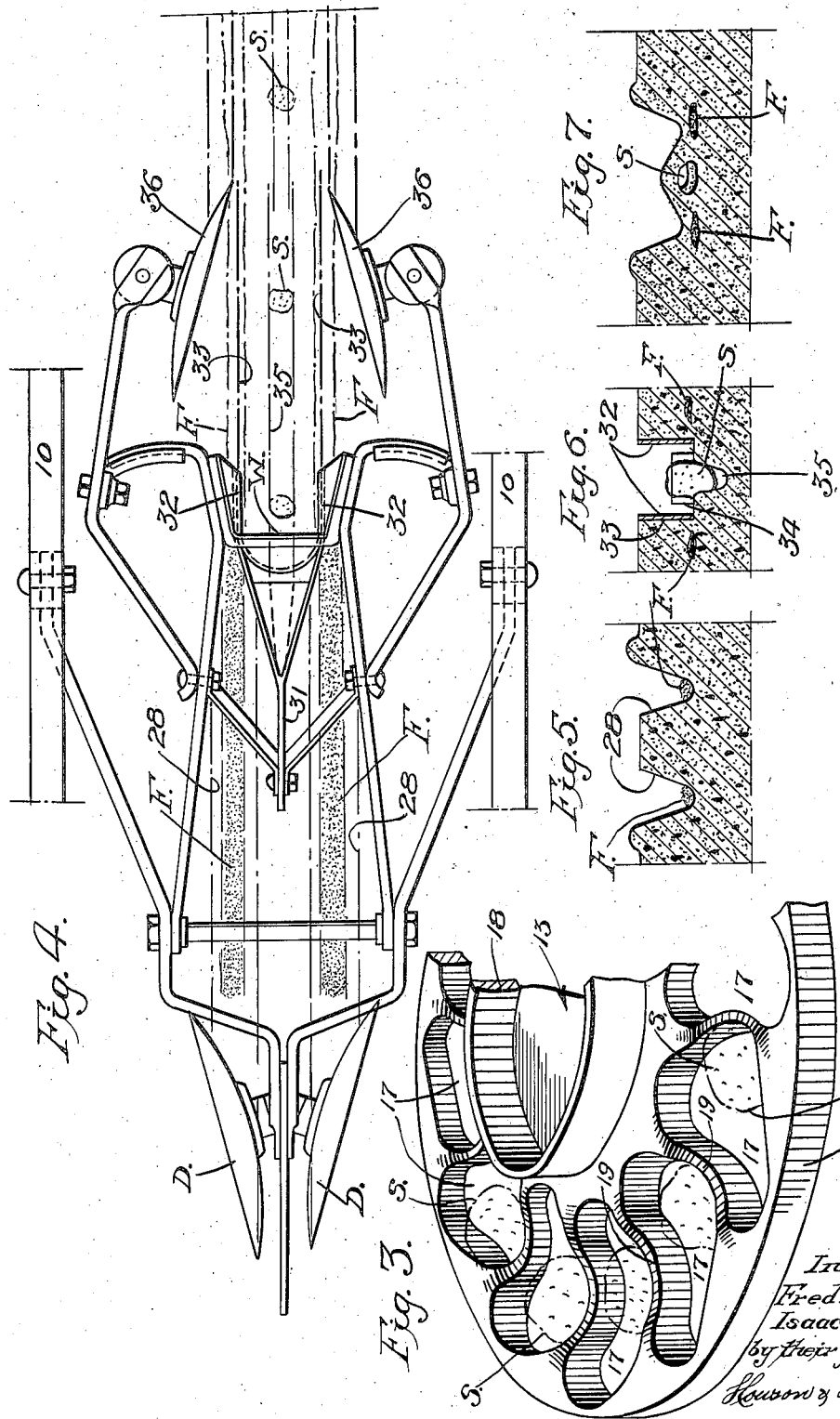

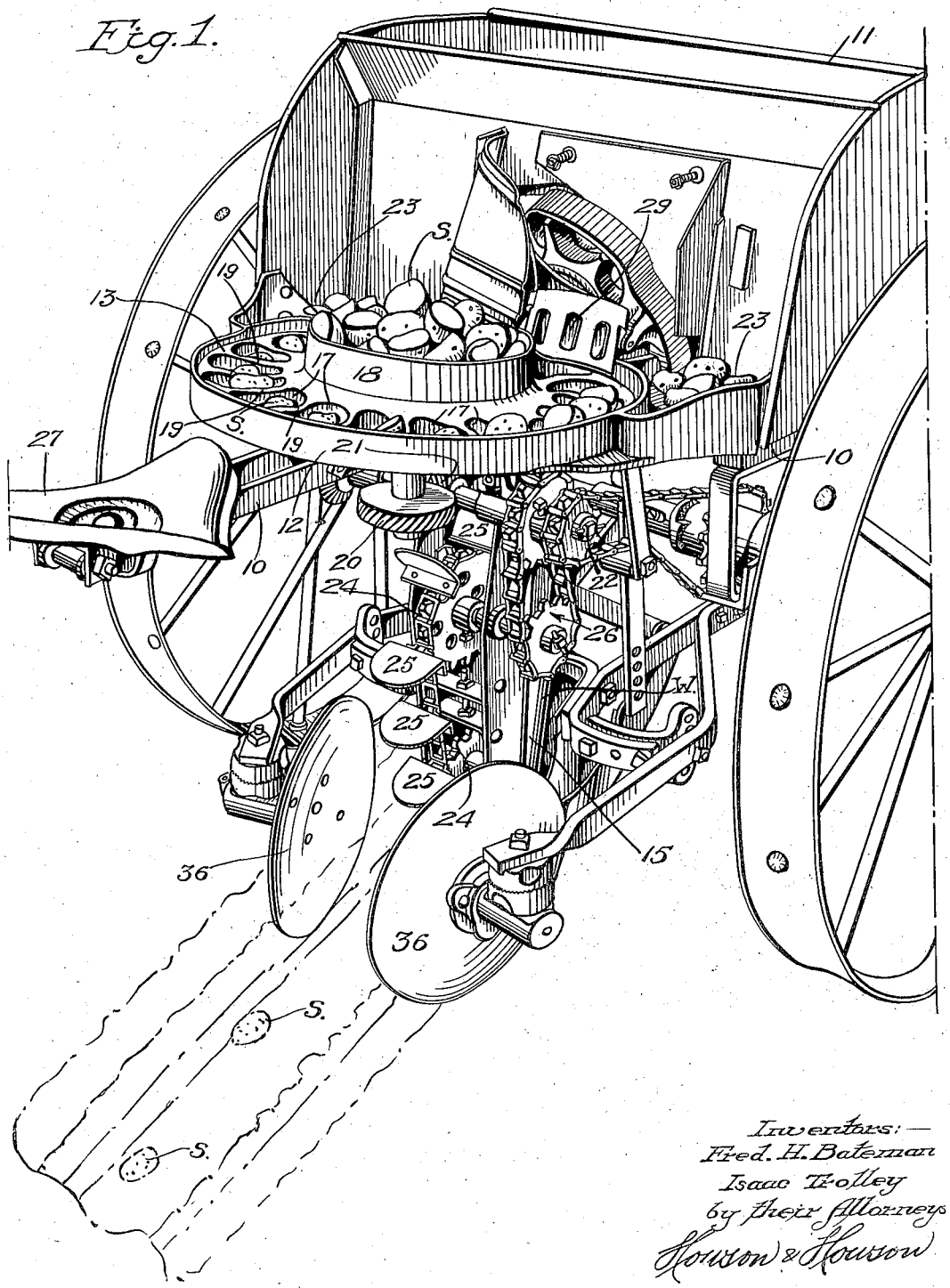

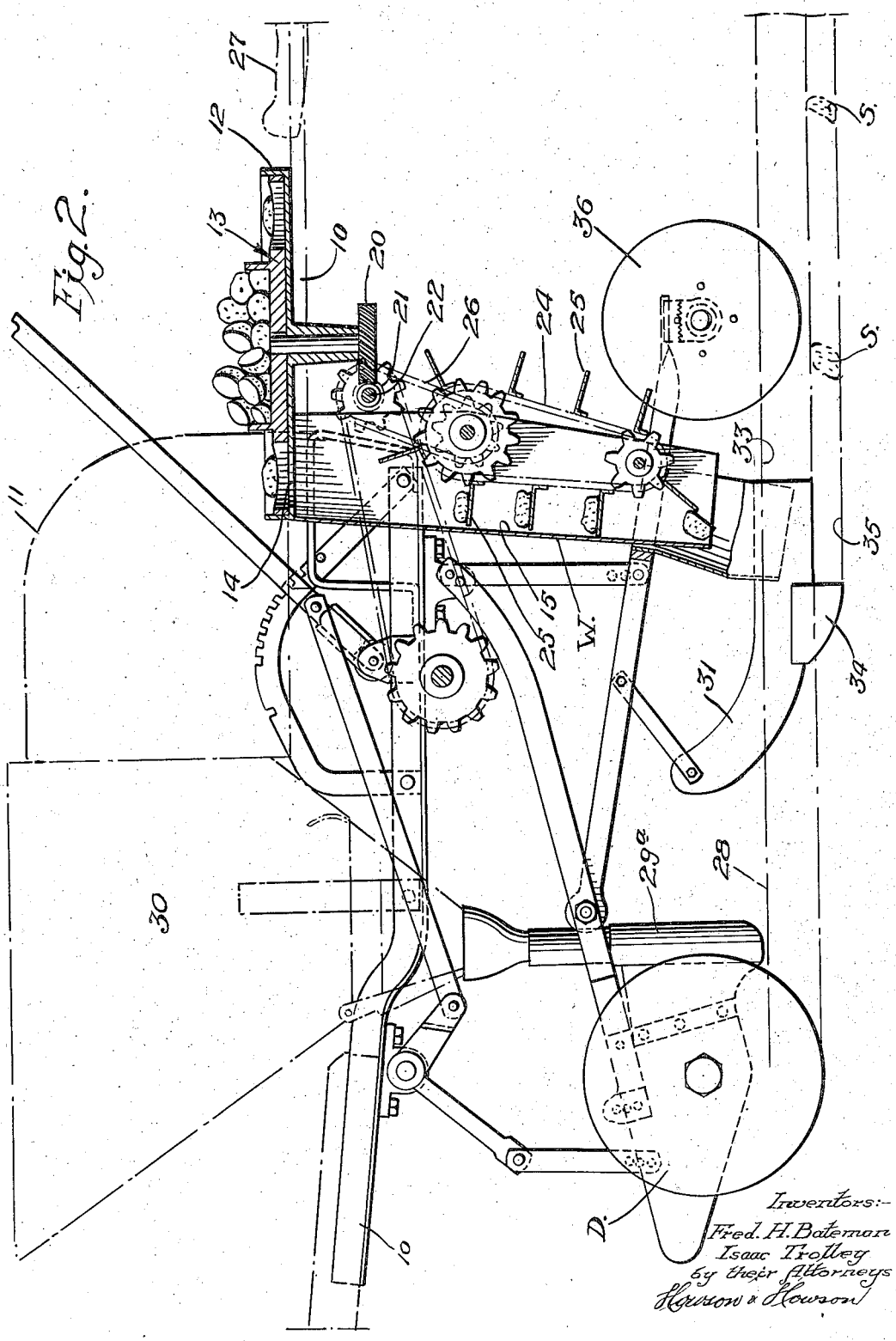

Patented Sept. 8, 1936

2,053,390

UNITED STATES PATENT OFFICE 2,053,390

ASSISTED FEED PLANTER

Fred H. Bateman and Isaac Trolley, York, Pa.

Application December 21, 1933, Serial No. 703,470

6 Claims. (Cl. 221—138)

This invention relates to potato planters and more particularly to potato planters of what is generally known as the "assisted feed" type. Such planters have come into extensive use due to the fact that they make for much more accurate and complete planting than is possible with any entirely automatic planter and to the fact that it is possible to readily remove any damaged or infected seed which may have been overlooked in preparation. As at present constructed, these devices usually comprise a feed wheel and a delivery device for distributing the seed in pockets formed in the feed wheel. The feed wheel, after receiving the seed from the delivery device, rotates in front of the person who is assisting in the feed and any skips or doubles are corrected before the feed wheel comes over the delivery opening through which the seed are discharged. The opening or pocket of the feed wheel must be of sufficient size to accommodate the largest size of seed which the planter is capable of handling and ordinarily the smaller seed have a tendency to crowd outwardly in these pockets so that they do not properly align with the discharge spout. This leads to unevenness in spacing of the seed and consequent variation in the size of the potatoes grown from the seed, it having been well established that variations in spacing cause variations in the size of the product. Since such variations are extremely undesirable, particularly in the growing of seed potatoes, it is desirable that all such inaccuracies be removed where it is possible.

This invention contemplates the provision of a feed wheel of such construction that the seed pieces will at all times move in a path at a given radial distance from the center of the wheel and, accordingly, at all times accurately center with relation to the discharge spout, and in which the construction is such that the removal of doubles or undesirable pieces is facilitated.

A further object of the invention is to improve the holding hopper, employed in holding seeds for replacement purposes by the feed assistant, so that it becomes unnecessary for the assistant to reach entirely across the feed wheel to obtain a fresh supply or take care of the surplus. This enables an increase in the size of the feed wheel with a corresponding increase in the number of pockets employed therein and, accordingly, in the area through which replacements or removals can be made.

A further object of the invention is the provision of means for receiving the seed as it is discharged from the feed wheel and supporting the same until it is in approximate contact with the ground so that the seed instead of being merely dropped through a spout upon the ground is laid upon the ground and has no tendency to roll or bounce and become displaced from its proper position.

A further object of the invention is the provision of furrow-forming means which produces a furrow having a centrally grooved bottom, the groove receiving the seed and providing an accurate aligning means for maintaining the seed in predetermined position in the groove.

A further object of the invention is the provision of a potato planting method which will insure proper relative positioning of fertilizer and the seed potato.

These and other objects we attain by the construction shown in the accompanying drawings wherein, for the purpose of illustration, we have shown a preferred embodiment of our invention and wherein:

Fig. 1 is a rear perspective of a potato planter constructed in accordance with our invention;

Fig. 2 is a vertical sectional view through the feed mechanism;

Fig. 3 is an enlarged fragmentary perspective of the feed wheel;

Fig. 4 is a plan view of the furrow-forming and closing devices illustrating diametrically the method of correlating the seed potatoes and the fertilizer; and Figs. 5, 6, and 7 are sectional views illustrating the several steps of the method.

Referring now more particularly to the drawings, the numeral 10 generally designates the frame of a potato planter 11, which frame includes a base plate 12 rotatably supporting a feed wheel 13. Plate 12 has a discharge opening 14 overlying the spout 15 through which potatoes are delivered for planting. The feed wheel 13 comprises a disc 16 having a series of pockets or seed openings 17 formed therethrough adjacent the periphery thereof. Immediately inwardly of the pockets, the disc has an upstanding flange 18 forming a receptacle for seeds. Each pocket 17 has its rear wall arcuately curved and rearwardly bowed so as to provide a substantially V-shaped notch for locating the seed S at a predetermined point in the pocket. The rear wall of each pocket is, furthermore, reduced in height at the central portion thereof, as more clearly shown at 19 in Fig. 3, through a short distance so that the potato located in a pocket may be more readily gripped by the fingers. The feed wheel 13 is driven in any suitable manner, the present illustration comprising a shaft extended through the frame and equipped with a worm wheel 20 driven by a worm 21 on a transversely-extending shaft 22. The frame 10, as in the ordinary construction, may be formed to provide side storage pockets 23 for the reception of seeds where this is desired. Where this construction is employed, the contents of the pockets 23 will be employed for replenishing or reducing the supply in the storage compartment formed by the upstanding flange 18.

The spout for delivery of the potatoes to the ground is of modified construction comprising a U-shaped stationary wall W and a downwardly moving wall consisting of a conveyer chain 24 having spaced flights 25. This conveyer chain is operated in timed relation to the rotation of feed wheel 13, being at present illustrated as connected to shaft 22 by chain and sprocket gearing generally designated at 26. As each pocket 17 of the feed wheel 13 moves over to the discharge opening, a flight 25 is disposed immediately beneath the discharge opening to receive the seed discharged therethrough. The seed, confined upon the flight by the remaining walls of spout 15, is lowered by the flight to a very short distance above the bottom of the furrow formed for the reception of the seed and the seed is, accordingly deposited gently in the furrow and has little or no tendency to roll or bounce therein. As each flight reaches the lower limit of its travel and inclines downwardly, the potato sliding therealong to the wall of the spout is both centered by the spout wall and accurately longitudinally positioned thereby. It will be obvious that the accurate placement of the seed with the resulting accurate delivery of the seed at properly timed intervals to the spout is of extreme importance when employed in conjunction with delivery apparatus of the type just described as otherwise a seed delayed in delivery might be caught by the flight and the wall of the spout with possible injury to either thereof. With accurate delivery, it is possible to insure clear dropping of the seed upon the flight when properly positioned to receive the same, thus completely eliminating any possible damage to the seed.

This apparatus may be employed in conjunction with any suitable mechanism for delivering the seed to the feed wheel, that at present generally illustrated being the feed mechanism described in our Patent No. 1,912,248 granted May 30, 1933 for Potato planter.

In use of the apparatus, the assistant occupies a seat 27 at the rear of the feed wheel 13, from which position he can closely observe the seed in the pockets 17 between the point 29 where they are delivered to the wheel and the point of their discharge through opening 14 which is spaced approximately 330 degrees from the point of delivery. Due to the large diameter of the wheel, he has the seed under observation for a considerable period so that he may readily detect inferior seed and remove the same, remove any doubles which may occur and fill in any "skips". Doubles removed from the pocket are placed in the central storage chamber of the wheel, and skips are replaced from this same chamber. By providing the storage chamber at the center of the wheel, the use of the relatively large wheel is made possible, for without the central storage compartment it would be practically impossible for the assistant to reach the storage pockets ordinarily provided.

The above-described mechanism is preferably employed in conjunction with the furrow-opening and closing devices more particularly illustrated in Figs. 2 and 4. These comprise a pair of initial opening discs D forming fertilizer grooves 28 in which fertilizer F is periodically deposited through a pair of fertilizer delivery spouts 29—a from the fertilizer storage chamber 30. The ridge between the grooves 28 is split by a shoe 31 which shoe is divided to provide wings 32 supporting the earth at the side walls of the furrow 33 thus formed and further embodies a grooving shoe 34 which forms at the center of the bottom of the furrow 33 a groove 35. This groove immediately underlies the potato seed as it leaves the spout and receives the same, serving to accurately center this seed in the furrow 33 so that it may not approach too closely either of the fertilizer bands F. Following the deposit of the seed, closing discs 36 cover the seed, preferably by that method described in our prior Patent No. 1,895,962 issued January 31, 1933 for Method of planting potatoes; that is to say, by slicing material from the walls of the furrow 33 to an extent sufficient to shallowly cover the seed.

As the construction hereinbefore set forth is, obviously, capable of considerable modification without in any manner departing from the spirit of the invention, we do not wish to be understood as limiting ourselves thereto except as hereinafter claimed.

We claim:

1. In a potato planter, a discharge spout and seed-feeding means for delivery to the discharge spout comprising a supporting plate having an opening communicating with the spout a disc of large diameter rotating upon the plate and having a series of pockets adjacent its periphery, means to feed seed potatoes to said disc leaving the major portion of the disc exposed for manual insertion, replacement, or removal of seeds, said pockets being of greater width than the opening and having the rear walls thereof rearwardly arcuately curved whereby to center the seed in the pockets for accurate alignment with the opening during movement of the seed over the plate to said opening.

2. In a potato planter, a discharge spout and seed-feeding means for delivery to the discharge spout comprising a supporting plate having an opening communicating with the spout, a disc of large diameter rotating upon the plate and having a series of pockets adjacent its periphery, means to feed seed potatoes to said disc leaving the major portion of the disc exposed for manual insertion, replacement, or removal of seeds, said pockets being of greater width than the opening and having the rear walls thereof rearwardly arcuately curved whereby to center the seed in the pockets for accurate alignment with the opening during movement of the seed over the plate to said opening, the rear walls of said pockets being reduced in height at the centers thereof.

3. In a potato planter, a rotatable feed wheel comprising a disc having seed pockets formed therethrough adjacent the periphery thereof, mechanical means to deliver seed potatoes to the openings of said disc and an annular flange upstanding from the disc inwardly of said series of pockets and combining with the disc to produce a storage compartment for seed to be manually placed in said openings.

4. In a potato planter, a discharge spout comprising a continuously downwardly-moving wall having spaced flights thereon and stationary wall means preventing dislodging of seed on the downwardly-moving flights, a substantially flat, freely accessible rotating disc of large diameter having seed pockets therein, a support upon which the disc rotates having an opening communicating with the upper end of the spout, means for supplying seeds to the pockets of said disc, means for centering the seeds during rotation of the disc between the point of supply and said opening, and means for operating said disc and moving wall in timed relation, said disc including storage means for seed potatoes which may be removed from said storage means and inserted manually in the openings of the disc while the disc is in motion.

5. In a potato planter, a discharge spout comprising a continuously downwardly moving wall having spaced flights thereon and stationary wall means preventing dislodging of seed on the downwardly moving flights, a substantially flat, freely accessible rotating disc having an annular series of seed pockets therein disposed above the upper end of the discharge spout, the openings of said disc being relatively wide as compared to the seed to be received therein, a support upon which the disc rotates having an opening communicating with the upper end of the spout, said opening being of less width than the pockets and being centrally aligned with the annular series of pockets, mechanical means for supplying seeds to the pockets of said disc leaving the major portion of the disc exposed to permit manual assistance of said feeding means, means for centering the seeds against the rear walls of the pockets during rotation of the disc between the point of supply and said opening, and means for operating said disc and moving wall in timed relation.

6. A device as claimed in claim 5 wherein the disc inwardly of the annular series of pockets has an upstanding flange defining a shallow seed-receiving magazine containing seeds for manual distribution.

FRED H. BATEMAN.
ISAAC TROLLEY.